United States Patent [19]

de Fremery

[11] 4,111,467
[45] Sep. 5, 1978

[54] ROTATABLE COUPLING FOR A PLURALITY OF CONDUITS, PARTICULARLY FOR A BUOY

[75] Inventor: Frank P. de Fremery, Schiedam, Netherlands

[73] Assignee: N.V. Industrieele Handelscombinatie Holland, Rotterdam, Netherlands

[21] Appl. No.: 786,995

[22] Filed: Apr. 13, 1977

[30] Foreign Application Priority Data

Apr. 13, 1976 [NL] Netherlands ............... 7603915

[51] Int. Cl.² .................. F16L 39/00; B65G 67/58
[52] U.S. Cl. ............................ 285/136; 285/190
[58] Field of Search ............... 285/136, 190, 223

[56] References Cited

U.S. PATENT DOCUMENTS

| 1,851,723 | 3/1932 | Neidow | 285/136 |
| 2,187,147 | 1/1940 | Englesson | 285/136 |
| 2,322,679 | 6/1943 | Williamson | 285/190 X |
| 2,781,134 | 2/1957 | Weir et al. | 285/136 X |
| 3,147,015 | 9/1964 | Hanback | 285/190 |
| 3,838,718 | 10/1974 | Flory et al. | 285/136 X |

FOREIGN PATENT DOCUMENTS 686,638  1/1953  United Kingdom ............ 285/184

Primary Examiner—Werner H. Schroeder
Assistant Examiner—C. J. Arbes
Attorney, Agent, or Firm—Young & Thompson

[57] ABSTRACT

A rotatable coupling for a plurality of conduits for different media, comprises a core member with a number of axial passageways connecting to conduits coupled to the core member at various levels. The conduits communicate with annular spaces defined between the core member and a plurality of stacked rotatable ring members. The core member is made up of a stack of bodies connected to each other by tension bolts or the like, these stacked bodies having radially projecting flanges between which the rotatable rings are axially confined. The rotatable rings have ample play both in axial and in radial directions.

6 Claims, 3 Drawing Figures

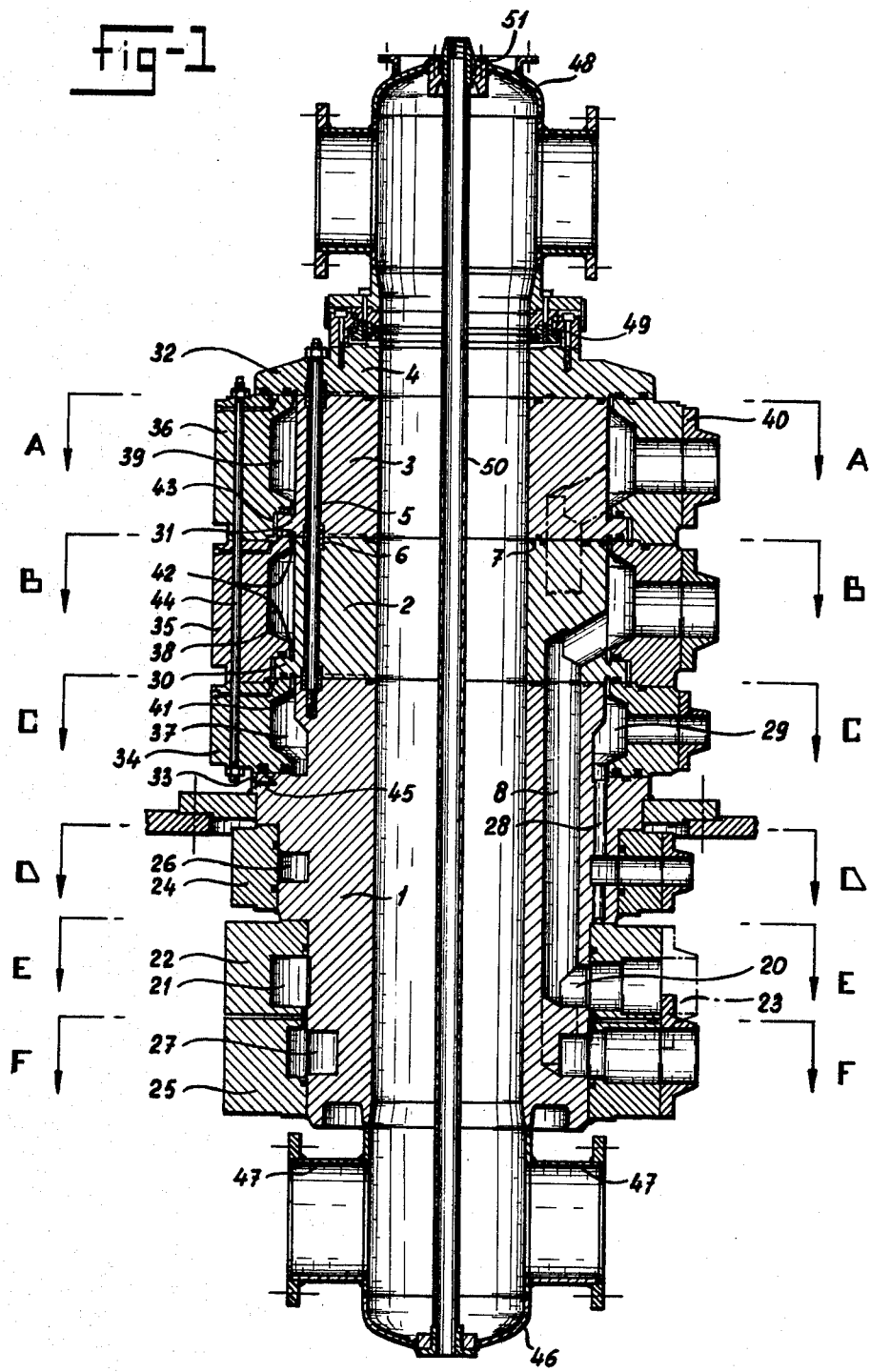

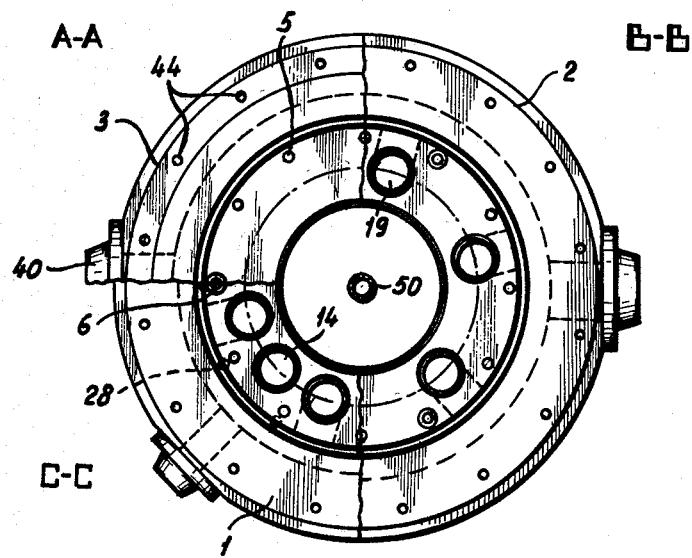
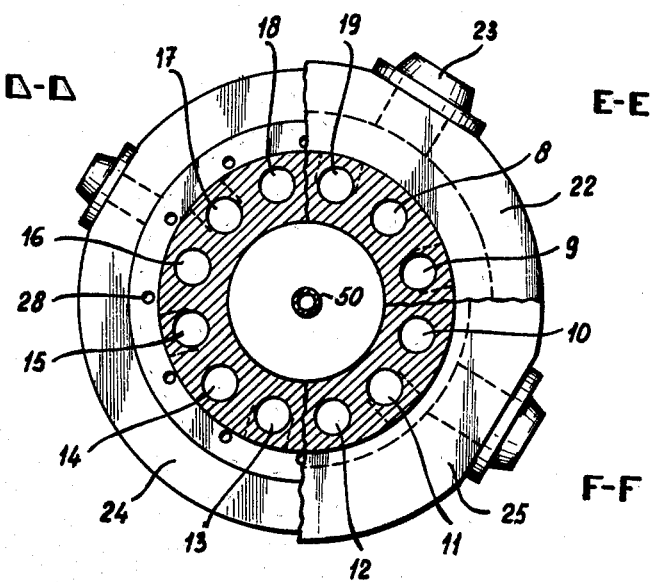

ROTATABLE COUPLING FOR A PLURALITY OF CONDUITS, PARTICULARLY FOR A BUOY

The present invention relates to a rotatable coupling for a plurality of conduits for different media, particularly for a buoy or similar loading and unloading device, said coupling comprising a stationary core member, said core member being provided with a number of axial passageways connecting to the conduits coupled to the core member and said passageways at various levels connecting to circular spaces via cross-bores, said spaces being constituted between a number of rotatable ring members disposed in axial arrangement on top of each other and the core and being sealed with respect to the core and each one of said passageways connecting to a conduit via a radial bore. A coupling of this kind is known from U.S. Pat. No. 3,237,220 for a buoy, and from U.S. Pat. No. 2,781,134 in the hydraulic circuit of a rotatable crane.

In these known couplings, the parts which are rotatable relatively to the core member are radially sealed with respect to said core member. In the device known from U.S. Pat. No. 3,237,220 the ring members are secured to an outer casing being rotatably mounted on the core member by means of upper and lower ball bearings. This means that all parts must be manufactured with high precision and that assembly should be carried out very carefully and accurately, inasmuch as damage may occur to the radial sealing rings to be mounted beforehand. In the device known from U.S. Pat. No. 2,781,134 the ring members are stacked independently on top of each other and sealed with respect to the core member in radial direction and with respect to each other. Also in this case problems arise during assembly as the sealing rings should slide over the mouths of the passageways in the core member, which may cause damage. Repair work is therefore time-consuming.

It is the object of this invention to provide a rotatable coupling of simple construction having a large passage for several media, under comparatively high pressure, which coupling can stand up to rough handling and does not need a high degree of accuracy during manufacture.

In accordance with this invention, said object is achieved in that the core member, at least at the level of the rotatable ring members, comprises a pack of stacked bodies connected to each other by tension bolts or the like, each body possessing a radially projecting flange and the rotatable ring members being axially confined with ample play in radial direction between said flanges and being sealed in axial direction with respect to said flanges.

By the fact that the core member consists of a packet enclosing the rotatable ring members in axial direction, said ring members having considerable play in radial direction, a coupling is formed which can be mounted and removed in a simple manner, while an effective seal of the various media with respect to each other is still provided. Ample play in radial direction between the rotatable ring members and the bodies of the core means that manufacture does not need a high degree of accuracy. In axial direction, enclosure is affected between flanges where sealings are present which may easily seal off the gap between flange and rotatable ring member because said ring members are subjected to axial loads at the most to a small degree by the forces acting substantially in radial direction on the rotatable ring members.

The conduits connected to the core may also be connected to ring members which are mounted on the core and which in the same way constitute circular spaces which communicate with the longitudinal passageways. Said ring members may have been welded onto the core.

The rotatable ring members may have been joined to a pack with the aid of tension bolts.

For each medium, preferably at least two axial passageways are used which are spaced at regular intervals relatively to the circumference of the core in order to improve the balance formed by the circular grooves between core and rotatable ring member.

The rotatable coupling in accordance with the invention may have a central low-pressure line, at the top of which a rotatable coupling is present with diametrically directed branches in order to obtain balance in a known manner.

A stationary pipe may run through the centre of the low-pressure line and through the rotatable coupling, said pipe extending via a radial flange packing through the upper wall of the rotatable coupling. Said pipe can be used e.g. for the passage of an electricity cable, a compressed-air pipe or the like. Using the core for this purpose is known per se, e.g. from U.S. Pat. No. 2,781,134, mentioned before. The invention provided an extremely simple coupling, the core of which comprises a pack of ring members to which the stationary supply lines may be connected also via welded ring members and the rotatable conduits have been connected via the rotatable ring members. During assembly and disassembly there is no need for accuracy since the movements which then take place, i.e. lifting off, do not involve the loading of the seals and, consequently, said seals cannot be damaged.

The invention will now be described more in detail with reference to the accompanying drawings, wherein:

FIG. 1 is a sectional view of the coupling according to the invention;

FIG. 2 illustrates three different sections; and

FIG. 3 illustrates three other sections.

The coupling illustrated in FIG. 1 comprises a central core composed of the stationary lower part 1 with rings 2, 3 and 4 positioned thereon. These core members 1 to 4 inclusive are clamped onto each other by means of tension bolts 5 and centered with the aid of ring members 6. Gaskets 7 are disposed at several points between said clamped bodies 1 to 4 inclusive of the central core.

In the central core constituted in this manner a large number of axial passageways 8 to 19 inclusive are present, six of which, indicated by even reference numerals 8 to 18 inclusive, are connected at the same level, differing however from the level of the other six passageways, to their inlet by means of a cross-bore 20 opening into a circular groove, such as e.g. groove 21. Said circular groove 21 is present between ring member 22 and body 1 and it has a connecting part 23 for a supply line.

In the embodiment illustrated there are three ring members, i.e. ring member 24 above ring member 22 and ring member 25 below ring member 22. Ring members 24 and 25 constitute with the casing 1 passageways 26 and 27 respectively.

The left part of FIG. 3 is a sectional view of the lower part of the device taken along the line D—D; the right upper part is a sectional view taken along the line E—E and the right lower part is a sectional view taken along the line F—F.

Reference numeral 28 indicates a number of axial bores between the circular space 26 and the circular space 29 of the rotatable section of the coupling. In the illustrated embodiment there are twelve passageways 28 altogether.

Part of the axial passageways in bodies 2 and 3 terminate in said body 2 and the others terminate in body 3; thus, body 2 has continuous bores for the passageways terminating in body 3. The upper body 4 acts as sealing means and has, therefore, no passageways.

It is evident that based on this principle the number of bodies of type 2 and 3 respectively can easily be increased.

It is also evident that instead of the lowermost body 1 said body can also be built up of bodies of the same kind as bodies 2 and 3 respectively, e.g. by positioning such identical bodies mirror-inverted relative to the bodies 2 and 3.

Each body has been provided with a radial flange, i.e. flanges 30, 31 and 32.

Body 1 has also a radial flange indicated by reference numeral 33.

The rotatable part of the coupling is constituted by ring members 34, 35 and 36, said ring members together with bodies 1, 2 and 3 constituting circular passageways 37, 38 and 39, each one of said passageways being provided with connecting parts, as indicated by reference numeral 40 in FIG. 1.

As is apparent from FIG. 1, said ring members have ample play in radial direction relatively to the core of bodies 1, 2 and 3, said play being indicated by reference numerals 41, 42 and 43 in FIG. 1.

In axial direction the ring members are enclosed between the flanges; ring member 34 lies between flanges 33 and 30, ring member 35 lies between flanges 30 and 31 and ring member 36 lies between flanges 31 and 32. U-shaped or V-shaped gaskets (in cross-section) are positioned on the places of contact of the ring members with the flanges, i.e. gaskets of the type which can take some play and yet provide an effective seal.

In the embodiment illustrated in FIG. 1, ring members 34, 35 and 36 are rigidly attached to each other by means of tension bolts 44.

Minor leakages, if any, may be discharged via channels as indicated by reference numeral 45.

A connecting part 46 is disposed at the lower part of body 1, said connecting part having opposed connecting branches 47 for the connection of a medium pipe. The hollow central section of the coupling may then be used for the conveyance of a medium, e.g. gas and to that end a single rotatable coupling, also in the form of a T-shaped part 48, is positioned on the top of body 4, said coupling being essentially identical to the lowermost part 46 but being pivotally attached via double ball bearings 49.

Lead 50 extends through the centre of the device, said lead being rigidly secured in the lower portion 46, rotatably secured in the upper portion 48 and sealed at that region with the aid of a gasket 51.

All inlets and outlets are balanced.

Assembly of the complete device is in fact nothing else but stacking in the right sequence of the various parts and securing with the aid of tension bolts 5 and 44. High precision during manufacture is no longer required since play is allowed intentionally in radial direction; play in axial direction is insignificant and when it is thought to be too large it can easily be compensated by inserting thin discs, e.g. between the contact surfaces of the bodies 1, 2, 3 and/or 4 and between the contact surfaces of ring members 34, 35 and/or 36 respectively.

When the body 1, as indicated above, is built up of bodies which are identical to the bodies 2 and 3 but which are positioned mirror-inverted, also the lowermost connecting part 46 may be connected correspondingly to element 4 via a seal but, of course, without the use of a bearing.

The ring members to be used in the lower part in conformity with rings 35 and 36 need not be rotatable. If they are secured by welding, gaskets are not required. It is preferred, however, to embody and seal the ring members in the same manner as in the rotatable upper portion but to block their rotatability with the aid of other means for a coupling is thus obtained which comprises a small number of identical parts, in which assembly and disassembly cause no problems so that also for repair work in most cases disassembly of the coupling as a whole will no longer be required.

What I claim is:

1. Rotatable coupling for a plurality of conduits for different media, particularly for a buoy or similar loading and unloading device, said coupling comprising a stationary core member, said core member being provided with a number of axial passageways connecting to conduits coupled to the core member and said passageways at various levels connecting to circular spaces via crossbores, said spaces being constituted between a number of rotatable ring members disposed in axial arrangement on top of each other and the core and being sealed with respect to the core and each one of said passageways connecting to a conduit via a radial bore, characterized in that core member, at least at the level of the rotatable ring members, comprises a pack of stacked bodies connected to each other by tension bolts or the like, each body possessing a radially projecting flange and the rotatable ring members surrounding said stacked bodies and being axially enclosèd with ample play in radial direction between said flanges and being sealed in axial direction with respect to said flanges.

2. Rotatable coupling in accordance with claim 1, characterized in that the conduits coupled to the core member are connected to said ring members, said ring members constituting circular grooves with the core member, which communicate with the axial passageways via cross-bores.

3. Rotatable coupling in accordance with claim 1, characterized in that the rotatable ring members are connected to each other by axial tension bolts.

4. Rotatable coupling in accordance with claim 1, characterized in that the axial passageways for each medium comprise at least two passageways spaced at regular intervals along the circumference.

5. Rotatable coupling in accordance with claim 1, characterized in that the core member has a concentric low-pressure line with a large diameter and a rotatable coupling with diametrically directed branches connects to the upper body of the pack.

6. Rotatable coupling in accordance with claim 5, characterized in that a stationary pipe runs in the centre of the low-pressure line and through the rotatable coupling, said pipe extending through the upper wall of the rotatable coupling via a radial gasket.

* * * * *